United States Patent
Maeder et al.

(10) Patent No.: US 11,968,722 B2
(45) Date of Patent: Apr. 23, 2024

(54) METHOD AND APPARATUS FOR SUPPORTING MASSIVE RANDOM ACCESS

(71) Applicant: NOKIA TECHNOLOGIES OY, Espoo (FI)

(72) Inventors: Andreas Maeder, Würzburg (DE); Richard Waldhauser, Munich (DE); Mikhail Vilgelm, Munich (DE); Murat Guersu, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 385 days.

(21) Appl. No.: 17/421,637

(22) PCT Filed: Jan. 30, 2019

(86) PCT No.: PCT/EP2019/052215
§ 371 (c)(1),
(2) Date: Jul. 8, 2021

(87) PCT Pub. No.: WO2020/156651
PCT Pub. Date: Aug. 6, 2020

(65) Prior Publication Data
US 2022/0132576 A1    Apr. 28, 2022

(51) Int. Cl.
*H04W 74/08* (2009.01)
*H04W 74/00* (2009.01)
*H04W 74/0833* (2024.01)

(52) U.S. Cl.
CPC ..... *H04W 74/0833* (2013.01); *H04W 74/006* (2013.01); *H04W 74/008* (2013.01)

(58) Field of Classification Search
CPC ... H04W 72/0466; H04W 72/52; H04W 4/70; H04W 4/38; H04W 72/542; H04W 74/0833; H04W 74/006; H04W 74/008
See application file for complete search history.

(56) References Cited

U.S. PATENT DOCUMENTS

| 9,258,831 B2 * | 2/2016 | Hakola | H04W 72/0466 |
| 2014/0192706 A1 * | 7/2014 | Wang | H04W 72/52 |
| | | | 370/315 |

(Continued)

FOREIGN PATENT DOCUMENTS

| CN | 101686559 A * | 3/2010 | H04W 74/002 |
| EP | 2 214 450 A2 | 8/2010 | |

(Continued)

OTHER PUBLICATIONS

Communication pursuant to Article 94(3) EPC dated Oct. 6, 2022, corresponding to European Patent Application No. 19702853.3.

(Continued)

*Primary Examiner* — Vinncelas Louis
(74) *Attorney, Agent, or Firm* — Lippes Mathias LLP

(57) ABSTRACT

Method and apparatus for supporting massive random access An access device configures resources for a proxy-based random access operation to the network and transmits an indication of the configured resources and of at least one identified support device and of a plurality of identified terminal devices to use the proxy-based random access operation, wherein the at least one support device is instructed by the indication to act as a proxy for the proxy-based random access operation. Then, the proxy-based random access operation can be enabled for the identified plurality of terminal devices via the at least one support device.

17 Claims, 6 Drawing Sheets

(56) References Cited

U.S. PATENT DOCUMENTS

| | | | | |
|---|---|---|---|---|
| 2015/0036630 A1* | 2/2015 | Chen | ................... | H04W 72/542 |
| | | | | 370/329 |
| 2016/0014668 A1* | 1/2016 | Chou | ..................... | H04W 4/38 |
| | | | | 455/7 |
| 2016/0119739 A1* | 4/2016 | Hampel | ................. | H04W 4/70 |
| | | | | 370/329 |
| 2016/0192420 A1 | 6/2016 | Kim et al. | | |

FOREIGN PATENT DOCUMENTS

| | | |
|---|---|---|
| EP | 2 328 379 A1 | 6/2011 |
| EP | 2 739 079 A1 | 6/2014 |
| KR | 101845398 B1 * | 4/2018 |

OTHER PUBLICATIONS

International Search Report and Written Opinion dated Sep. 13, 2019 corresponding to International Patent Application No. PCT/EP2019/052215.

\* cited by examiner

METHOD AND APPARATUS FOR
SUPPORTING MASSIVE RANDOM ACCESS

FIELD

This disclosure relates to communications, and more particularly to methods and apparatus for providing non-scheduled or random network access in a wireless communication system.

BACKGROUND

A communication system can be seen as a facility that enables communication between two or more devices such as user terminals, machine-like terminals, base stations and/or other nodes by providing communication channels for carrying information between the communicating devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

A communication system and associated devices typically operate in accordance with a given standard or specification which sets out what the various entities associated with the system are permitted to do and how that should be achieved. Since introduction of fourth generation (4G) services increasing interest has been paid to the next, or fifth generation (5G) standard. 5G may also be referred to as a New Radio (NR) network. Standardization of 5G or NR networks has been finalized in 3GPP release 15.

The Internet of Things (IoT) is a network of physical objects—vehicles, machines, home appliances etc. that use terminal devices including sensors or application programming interfaces (APIs) to connect and exchange data over the Internet. "Massive IoT" (mIoT) refers to a large number of such connected terminal devices. Support for massive IoT is important for future access networks, such as 5G or other cellular or wireless networks.

SUMMARY

There is provided according to a first aspect an apparatus comprising means for performing:

configuring, at an access device of a network, resources for a proxy-based random access operation to the network;

transmitting by the access device an indication of the configured resources and of at least one identified support device and of a plurality of identified terminal devices to use the proxy-based random access operation, wherein the at least one support device is instructed by the indication to act as a proxy for the proxy-based random access operation.

According to a second aspect, there is provided an apparatus comprising means for performing:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and receiving contention-based transmissions from at least some of the plurality of identified terminal devices; and performing the proxy-based random access operation for the identified plurality of terminal devices by forwarding data of the at least some of the received contention-based transmissions to the access device. According to a third aspect, there is provided an apparatus comprising means for performing:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and transmitting, from one of the plurality of identified terminal devices to the identified support device, contention-based transmissions for initiating the proxy-based random access operation.

According to a fourth aspect there is provided a method comprising:

configuring, at an access device of a network, resources for a proxy-based random access operation to the network; and transmitting by the access device an indication of the configured resources and of at least one identified support device and of a plurality of identified terminal devices to use the proxy-based random network access operation, wherein the at least one support device is instructed by the indication to act as a proxy for the proxy-based random access operation.

According to a fifth aspect there is provided a method comprising:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and receiving contention-based transmissions from at least some of the plurality of identified terminal devices; and performing the proxy-based random access operation for the at least some of the identified plurality of terminal devices by forwarding data of the received contention-based transmissions to the access device.

According to a sixth aspect there is provided a method comprising:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and transmitting, from one of the plurality of identified terminal devices to the identified support device, contention-based transmissions for initiating the proxy-based random access operation.

According to a seventh aspect there is provided a computer program product comprising instructions for causing an apparatus to perform at least the following:

configuring, at an access device of a network, resources for a proxy-based random access operation to the network; and transmitting by the access device an indication of the configured resources and of at least one identified support device and of a plurality of identified terminal devices to use the proxy-based random network access operation, wherein the at least one support device is instructed by the indication to act as a proxy for the proxy-based random access operation.

According to an eighth aspect there is provided a computer program product comprising instructions for causing an apparatus to perform at least the following:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and receiving contention-based transmissions from at least some of the plurality of identified terminal devices; and performing the proxy-based random access operation for the at least some of the identified plurality of terminal devices by forwarding data of the received contention-based transmissions to the access device.

According to a ninth aspect there is provided a computer program product comprising instructions for causing an apparatus to perform at least the following:

receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and transmitting, from one of the plurality of identified terminal devices to the identified support device, contention-based transmissions for initiating the proxy-based random access operation.

In a first example, the means of the apparatus of the first aspect or the method of the fourth aspect or the computer program product of the seventh aspect may be configured to transmit the indication in response to a determination of an overload situation of the network.

In a second example, the means of the apparatus of the first aspect or the method of the fourth aspect or the computer program product of the seventh aspect may be configured to determine an overload situation if a group paging request has been received from the network.

In a third example, the means of the apparatus of the first aspect or the method of the fourth aspect or the computer program product of the seventh aspect may be configured to determine an overload situation if a ratio of preamble collisions to an amount of activated preambles for network access exceeds a pre-determined threshold for a predetermined period of time.

In a fourth example, the means of the apparatus of the first aspect or the method of the fourth aspect or the computer program product of the seventh aspect may be configured to enable the proxy-based random access operation by default.

In a fifth example, the means of the apparatus of the first aspect or the method of the fourth aspect or the computer program product of the seventh aspect may be configured to configure the resources according to one or more of a detected current network load, a density or distribution of terminal devices, and a density or distribution of support devices.

In a sixth example, the means of the apparatus of the first aspect or the method of the fourth aspect or the computer program product of the seventh aspect may be configured to allocate the configured resource allocation by a device-to-device sidelink application and/or by an allocation of a bandwidth part in dependence on a determined amount of network load. Typically, there may be sidelink applications, e.g. in the core network supporting sidelink with configuration, e.g. security related, but not limited to that purpose.

In a seventh example, the means of the apparatus of the first aspect or the method of the fourth aspect or the computer program product of the seventh aspect may be configured to configure the resources by setting an initial power and a power increment for power ramping.

In an eighth example, the means of the apparatus of the first aspect or the method of the fourth aspect or the computer program product of the seventh aspect may be configured to perform the setting for the power ramping in dependence on one or more of a density of support devices, their distribution and a characteristic of an access channel.

In a ninth example, the means of the apparatus of the first aspect or the method of the fourth aspect or the computer program product of the seventh aspect may be configured to transmit the indication by a broadcast message or a radio resource control message.

In a tenth example, the means of the apparatus of the first aspect or the method of the fourth aspect or the computer program product of the seventh aspect may be configured to select the at least one identified support device and the plurality of identified terminal devices by one or more of correlating measurement reports, correlating position information, using timing advance information, using beam information, and using sidelink discovery information.

In an eleventh example, the means of the apparatus of the first aspect or the method of the fourth aspect or the computer program product of the seventh aspect may be configured to transmit the indication to the plurality of identified terminal devices during a set-up procedure.

In a twelfth example, the means of the apparatus of the first aspect or the method of the fourth aspect or the computer program product of the seventh aspect may be configured to use a user data mapping function for mapping user data packets received from the identified support device to respective ones of the plurality of identified terminal devices.

In a thirteenth example, the user data mapping function used by the apparatus of the first aspect or the method of the fourth aspect or the computer program product of the seventh aspect may be located at the access device, in a core network entity, or in a dedicated network entity.

In a fourteenth example, the means of the apparatus of the first aspect or the method of the fourth aspect or the computer program product of the seventh aspect may be configured to stop the proxy-based random access operation if no overload situation has been determined for a predetermined time period and no new data has been received from the at least one support device.

In a fifteenth example, the means of the apparatus of the second aspect or the method of the fifth aspect or the computer program product of the eighth aspect may be configured to aggregate data received from the at least some of the plurality of identified terminal devices and to forward the aggregated received data as an aggregated data packet to the access device.

In a sixteenth example, the means of the apparatus of the second aspect or the method of the fifth aspect or the computer program product of the eighth aspect may be configured to forward user data packets received from the at least some of the plurality of identified terminal devices individually to the access device.

In a seventeenth example, the means of the apparatus of the second aspect or the method of the fifth aspect or the computer program product of the eighth aspect may be configured to forward data received from the at least some of the plurality of identified terminal devices in one of a radio resource control message, a dedicated MAC information element, and a user-plane packet for a dedicated radio bearer.

In an eighteenth example, the means of the apparatus of the third aspect or the method of the sixth aspect or the computer program product of the ninth aspect may be configured to decide on an initiation of use of the indicated resources in response to an indication of the access device.

In a nineteenth example, the means of the apparatus of the third aspect or the method of the sixth aspect or the computer program product of the ninth aspect may be configured to transmit preambles followed by data to the identified support device in a two-step procedure or to directly transmit the data to the identified support device depending on a contention-based access configuration and in a contention-based fashion.

In a twentieth example, the means of the apparatus of the third aspect or the method of the sixth aspect or the computer program product of the ninth aspect may be configured to increase a transmit power if no acknowledgement to the contention-based transmissions has been received.

In a twenty-first example, the means of the apparatus of the first to third aspects and all its examples may comprise:
at least one processor; and
at least one memory including computer program code, the at least one memory and computer program code configured to, with the at least one processor, cause the performance of the apparatus.

The computer program products of the seventh to ninth aspects may be stored on a medium or may be downloaded from a network.

A chipset may comprise the apparatus as described herein.

BRIEF DESCRIPTION OF THE DRAWINGS

Some example embodiments will now be described with reference to the accompanying drawings in which.

DETAILED DESCRIPTION

Figure 1:
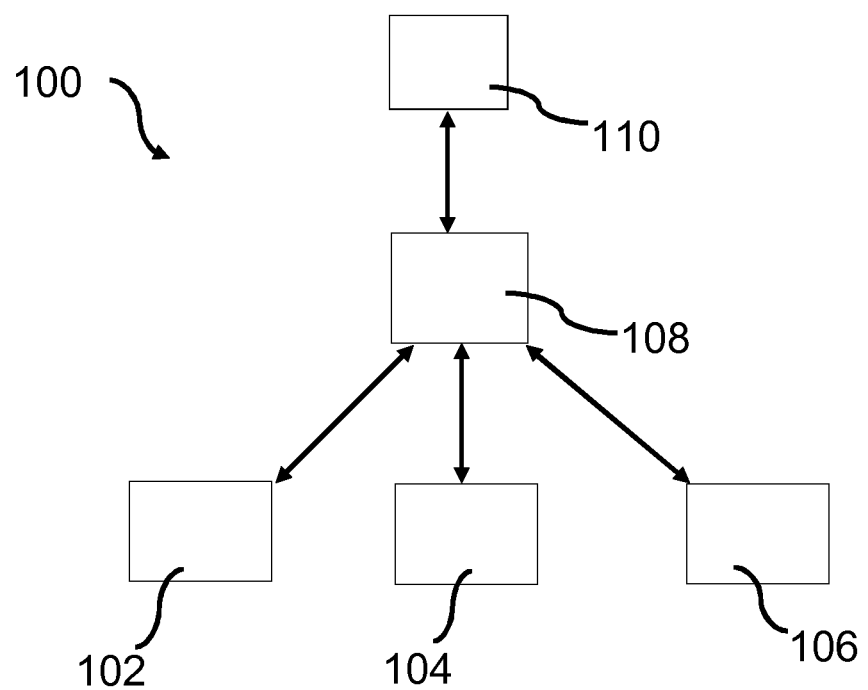
FIG. 1 shows a schematic example of a wireless communication system where the invention may be implemented.

The following describes in further detail some examples of systems, apparatus and possible mechanisms for providing random access to a cellular network, such as a fifth generation (5G) cellular network. It is however noted that some embodiments may also be implemented in other systems, apparatus and possible mechanisms for other types of networks with random access function.

In the present disclosure, the term "proxy" shall be understood as a device or function that acts as an intermediary for requests or other signaling from source devices or functions seeking access, resources, services or information from other devices or functions. The source device or function connects to the proxy device or function, requesting some service or information (e.g. response, activation, connection or other resources available from another device or function) and the proxy device or function evaluates and/or forwards the request or other signaling as a way to simplify and/or control its complexity.

As discussed in the background section above, support for massive IoT is important for wireless access networks, such as 4G or 5G networks. Typical massive IoT applications generate small data packets. These small packets may be generated infrequently and with irregular periodicity. This may lead to a need to establish a radio interface connection to a base station (such as an eNB or gNB or other type of access device) prior to every (or almost every) transmission. Additional overhead of establishing bearers in the core networks may thus be caused. Accordingly, overhead introduced by control plane procedures may be very high compared to the amount of data transmitted. This may also lead to high delays and inefficiency.

The random access (RA) procedure may also cause large delays for massive IoT applications. A reason for delays may be excessive collisions during preamble transmissions (e.g. a first step of a random access procedure explained later with reference to FIG. 2). Applying proper contention resolution techniques can reduce the amount of collisions. It needs to be considered that contention resolution trades off throughput for delay. On the other hand, increasing the amount of available channel resources can improve both throughput and delay.

One proposal is an implementation of one or more clusterhead nodes. In such a proposal, a node (i.e. the clusterhead) is responsible for aggregating and forwarding requests from multiple terminal devices (e.g. user equipments (UEs) in 4G or 5G terminology) to a base station (e.g. eNB or gNB). Collisions between the requests to the base station may therefore be avoided. However, resources may need to be allocated and signalled for the link between terminal devices and the clusterheads. Moreover, power control and timing advance issues may need to be addressed, e.g. if the base station needs to reply to the terminal devices.

According to some examples described hereinafter, a procedure how to operate a random access channel and a data proxy in a mobile network is proposed. This may for example include one or more of resource indication, identification of suitable terminal devices, configuration settings for power ramping, and user data transmission.

According to some examples described hereinafter, dedicated resources (such as bandwidth parts (BWPs), device-to-device (D2D) sidelinks, etc.) may be used for the proxy-based random access procedure.

According to some examples described hereinafter, a user data mapping function may be configured to correlate user data received via a proxy support device to corresponding endpoints (i.e. terminal devices such as IoT UEs).

FIG. 1 schematically shows an implementation according to an example of a network comprising a plurality of terminal devices (e.g. IoT UEs) 102, 104, 106. Although in this example three terminal devices are shown, it will be understood that in other examples more or fewer terminal devices may be present.

Furthermore, a support device 108 is provided, which is located (at least in terms of a communication path) between the terminal devices 102, 104, 106 and a base station 110 (e.g. a node B (eNB or gNB) or indeed any other type of access device).

The support device 108 may be considered a support or serving device which serves as a random access channel proxy device for terminal devices (e.g. terminal devices 102, 104, 106). In some examples the support device 108 may be in an always-connected mode, and thus may be termed an "acUE". To achieve this, the support device 108 may maintain a radio interface connection by periodically sending sounding reference signals. Basically, it is not going into idle mode e.g. by a timer. The terminal devices 102, 104 and 106 connect to the support device 108 instead of the base station 110. Accordingly, the support device 108 acts to forward data packets from the terminal devices 102, 104, 106 to the base station 110.

The support device 108 aggregates data packets from the terminal devices and forwards them to the base station 110. Contrary to the clusterhead approach, the support device acts as a proxy, while the clusterhead is not a proxy, but an aggregator, so it is non-transparent for the devices. This proxy-based operation may offload physical random access channels of the base station 110 by spatially distributing the load in the cells caused by a massive amount of terminal devices (e.g. IoT UEs) or large groups of unconnected terminal devices, e.g., during a group paging procedure.

Therefore, in some examples, it may be considered that the support device 108 serves as a transparent proxy from the point of view of the terminal devices 102, 104, 106, and that the support device 108 acts as a transparent or non-transparent proxy from the point of view of the base station 110. Whether the support device 108 acts in a transparent or non-transparent fashion may depend on the method of how user data from the terminal devices 102, 104, 106 is transmitted and potentially aggregated from the support device 108 to the base station 110.

On the air interface, connection establishment follows an RA procedure using a random access channel (e.g. RACH) and physical random access channel (e.g. PRACH) resources. The RA procedure is a four-way handshake (e.g. messages MSG1 to MSG4 in LTE and 5G), preceded by a broadcast (e.g. SIB2 information in 4G or 5G) by the base station. Thus, an access request may be completed if four messages have been successfully exchanged. Other contention-based random access procedures may involve more or fewer messages with different content.

The random access channel is formed by a periodic sequence of allocated time-frequency resources, called random access (RA) slots. These slots are reserved in the uplink channel of the network for the transmission of access requests. In the time domain, the duration of each RA slot depends on the format of the access requests. In the frequency domain, each RA slot occupies a bandwidth of a predetermined number (e.g. six) of physical resource blocks. The base station may broadcast information about the periodicity of the RA slots by means of a variable or parameter which may be referred to as the physical random access channel configuration index (which may be called PRACH configuration channel). The periodicity may vary between one RA slot every two frames and one RA slot per subframe.

Figure 2:
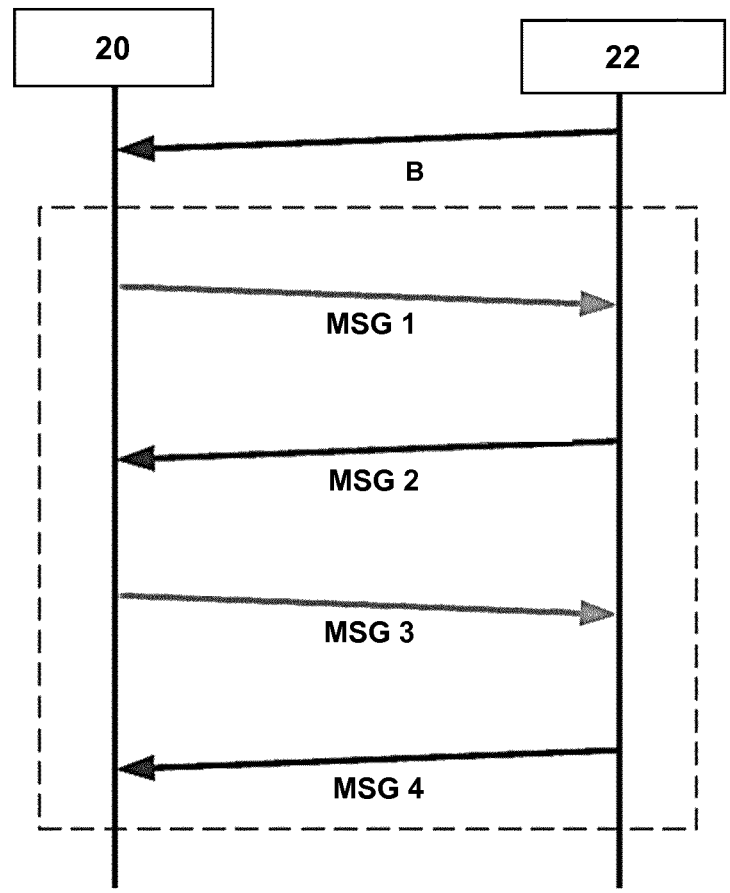
FIG. 2 shows an example of a contention-based random access procedure.

FIG. 2 shows a schematic signaling diagram of the above RA procedure between a terminal device (e.g. UE) 20 and a base station (e.g. eNodeB or eNB or gNB) 22, wherein respective arrows represent a message transfer and its direction, and wherein the time proceeds from top to bottom of FIG. 2.

Whenever the terminal device 20 wishes to access a random access channel, it selects the next available RA slot of the random access channel and transmit an access request with a randomly chosen preamble (e.g. digital signature) in the indicated PRACH resource(s) (e.g. PRACH preamble transmission (MSG1)). A predetermined number (e.g. 64) of orthogonal pseudo-random preambles (e.g. PRACH configurations) may be available for random access and the base station 22 periodically broadcasts in the downlink control channel an information B about the preambles which may be used for random access. The information B (e.g. SIB2) may correspond to or indicate a selected random access channel configuration index. However, the base station 22 may also reserve some of the preambles for contention-free access.

The terminal device 20 waits a predetermined period (e.g. three subframes) after the transmission of a selected preamble for a time window to receive a random access response (e.g. RAR in LTE) message (e.g. PRACH preamble reply (MSG2)) from the base station 22. The duration of this waiting window may be broadcast by the base station 22 and may be defined with a length between e.g. two and ten subframes. For every activated (detected) preamble, as long as sufficient physical downlink control channel (e.g. PDCCH) resources are available, the base station 22 may indicate a time and/or frequency location for a subsequent connection establishment request (MSG3).

In the next step of the handshake procedure, the terminal device 20 transmits a connection request message (e.g. Connection Request (MSG3)) to the base station 22 using the resources granted in the random access response message (MSG2) associated to the preamble transmitted in the selected RA slot. For the initial access, this message conveys a device identifier (e.g. UE identity) and a reason for the access request. All terminal devices that received an MSG2 message transmit such a connection request. If terminal devices chose the same preamble in MSG1, their requests are likely to cause destructive interference. This is referred to as collision.

Upon reception of a valid connection request message (MSG3), the base station 22 transmits a contention resolution message (e.g. Connection Reply (MSG4)) as an answer to the connection request message. The base station 22 authenticates the terminal device 20 and terminates the connection establishment procedure with a reply for every terminal device whose connection request message (MSG3) was successfully received.

Therefore, if the terminal device 20 does not receive the contention resolution message, it determines a failure in the contention resolution process and schedules a new random access attempt, i.e., a new preamble transmission, thereby starting the handshake process again.

Figure 3:
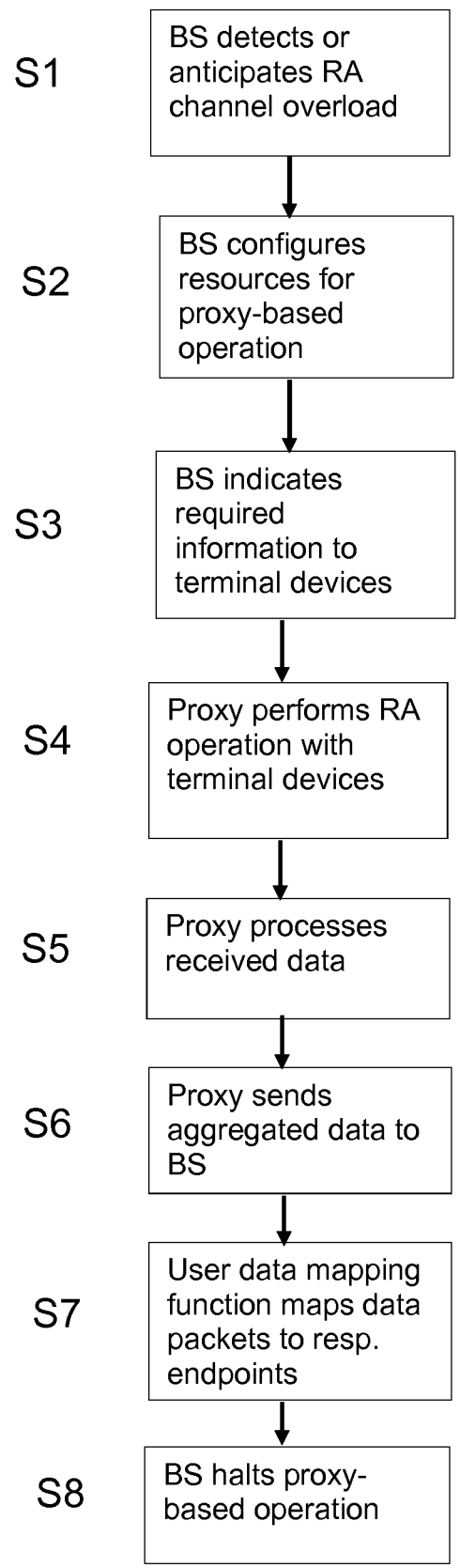
FIG. 3 shows a flow diagram of a proxy-based random access procedure according to an example embodiment.

FIG. 3 shows a flow diagram of an exemplary proxy-based access procedure based on the exemplary architecture of FIG. 1.

At step S1, the base station (BS) 110, e.g., eNB or gNB or other type of access device, detects or anticipates (e.g., if receiving a group paging request) a persistent overload on the physical random access channel (e.g. PRACH).

In some examples, for large cells with a constantly large number of terminal devices (e.g. massive IoT UEs), the proposed proxy-based operation could be enabled by default. For other scenarios, the proposed proxy-based operation could be enabled on-demand, upon detection, or upon prediction of an overload.

According to some examples, overload can be detected if a ratio of preamble collisions to an amount of activated (detected) preambles remains higher than a certain threshold for a predetermined and/or extended period of time. Overload may also be predicted (or anticipated), if the base station 110 is aware of a presence of a large number of terminal devices in the cell, and a group paging request for those terminal devices arrives.

In response to detecting an overload of the RA channel (e.g. PRACH), the base station 110 allocates resources for proxy-based operation as shown at step S2. This may generally be considered a resource configuration. The amount or level of resources may be configured according to one or more of a detected current load, an anticipated load, a density of terminal devices (e.g. IoT UEs), and a density of support devices (e.g. acUEs).

According to a first example, the resource allocation may comprise a bandwidth allocation. For example, a large bandwidth may be allocated for a high load, and a relatively smaller bandwidth may be allocated for a lower load. The bandwidth allocation may be realized using predetermined bandwidth parts (BWPs), whereby the base station configures and allocates a BWP for the proxy-based operation.

According to a second example, the resource allocation may be realized with a device-to-device (D2D) sidelink application, e.g. "proxy-based random access application function" located at the terminal and support devices. In such an example the base station 110 may configure the D2D sidelink application by using a "proxy-based random access control function", or the D2D sidelink application may be pre-configured. Further configuration of e.g. sidelink physical and transport channels, reference signals for measurements and a sidelink MAC layer for the sidelink between terminal devices and support device may be made by the base station using radio resource control (RRC) and/or system information broadcast dedicated to sidelink for proxy-based random access. Corresponding resources are administered by the operator and/or the "proxy-based random access control function.

Thus, a new sidelink application is proposed, e.g. "proxy-based random access application function" located at the terminal and support devices. This function may be configured by a e.g. "proxy-based random access control function" which may be located at the base station using e.g. RRC based communication. The ProSe framework also defines physical sidelink channels (e.g. broadcast (PSBCH), discovery (PSDCH), control (PSCCH) and shared (PSSCH) channel) as well as corresponding transport channels, reference signals for measurements and a media access control (MAC) layer for the sidelink between the devices. These is also configured by the base station to the terminal and support devices using RRC communication and/or sidelink application specific system information broadcast (SIB).

D2D communication in cellular networks is defined as direct communication between two terminal devices without traversing the base station 110 or core network. D2D communication may generally be non-transparent to the cellular network and it may occur on the cellular frequencies (i.e., inband) or unlicensed spectrum (i.e., outband).

According to some examples, the same resources may be used or re-used by all terminal devices and support devices within a group.

As an example, the amount of resources allocated (denoted R) may be chosen according to a density of terminal devices and support devices (denoted $\Lambda_u$, $\Lambda_a$, respectively) and the traffic pattern of the terminal devices, abstracted by a mean activation probability per PRACH slot (denoted p).

An expected number of terminal devices served per support device can thus be obtained as $$\frac{\Lambda_u}{\Lambda_a}.$$

The probability of a single terminal device to be successful at a given contention round may then be given as:

$$\frac{p}{R}\left(1 - \frac{p}{R}\right)^{\frac{\Lambda_u}{\Lambda_a}-1}.$$

The (normalized) success probability may be maximized with $$R^* = p\frac{\Lambda_u}{\Lambda_a}.$$

According to some examples the number of resources to be allocated may be chosen as R≥R*.

Allocating more resources introduces certain overprovisioning, e.g., to account for possible model inaccuracies.

Furthermore, in some examples, to minimize interference, power ramping settings may be configured and advertised together with the resources.

Power ramping settings may consist of an initial power (denoted $p_0$) and a power increment (denoted $p_\Delta$). The initial power may comprise an initial power with which a terminal device is configured to transmit to a support device, and the power increment may comprise a transmission power increment by the terminal device if the terminal device determines that the transmission was not successful. Whenever the terminal device is successful, it can save the resulting transmission power for the next time a proxy-based operation is indicated According to examples, the choice of the initial power and the power increment may be governed by a trade-off between access delay and potential interference with other support devices. The choice may depend on one or more of the density of support devices (denoted as $\Lambda_a$), their distribution, and the channel (which may be abstracted by a pathloss exponent a or another suitable parameter).

Assuming uniformly random placement of support devices, the expected delay to reach at least one support device for any random terminal device (denoted as D) may for example be calculated as:

$$D = \begin{cases} 1 & \text{if } \overline{p}(2\sqrt{\Lambda_a})^{-\alpha} \le p_0 \\ 1 + \log_{p\Delta}\frac{\overline{p}}{p_0}(2\sqrt{\Lambda_a})^{-\alpha} & \text{otherwise} \end{cases}$$

On the other hand, a probability of interfering with at least one other support device, at the moment of reaching the first support device may be given as:

$$P_{intf} = 1 - \exp(-\Lambda_a A) - \Lambda A \exp(-\Lambda_a A),$$

where A denotes an area given by:

$$A = \pi\left(\frac{p_0}{\overline{p}}\right)^{\frac{2}{\alpha}}\left((p_\Delta)^{\frac{2[D]}{\alpha}} - (p_\Delta)^{\frac{2[D]}{\alpha}}\right)$$

Figure 5:
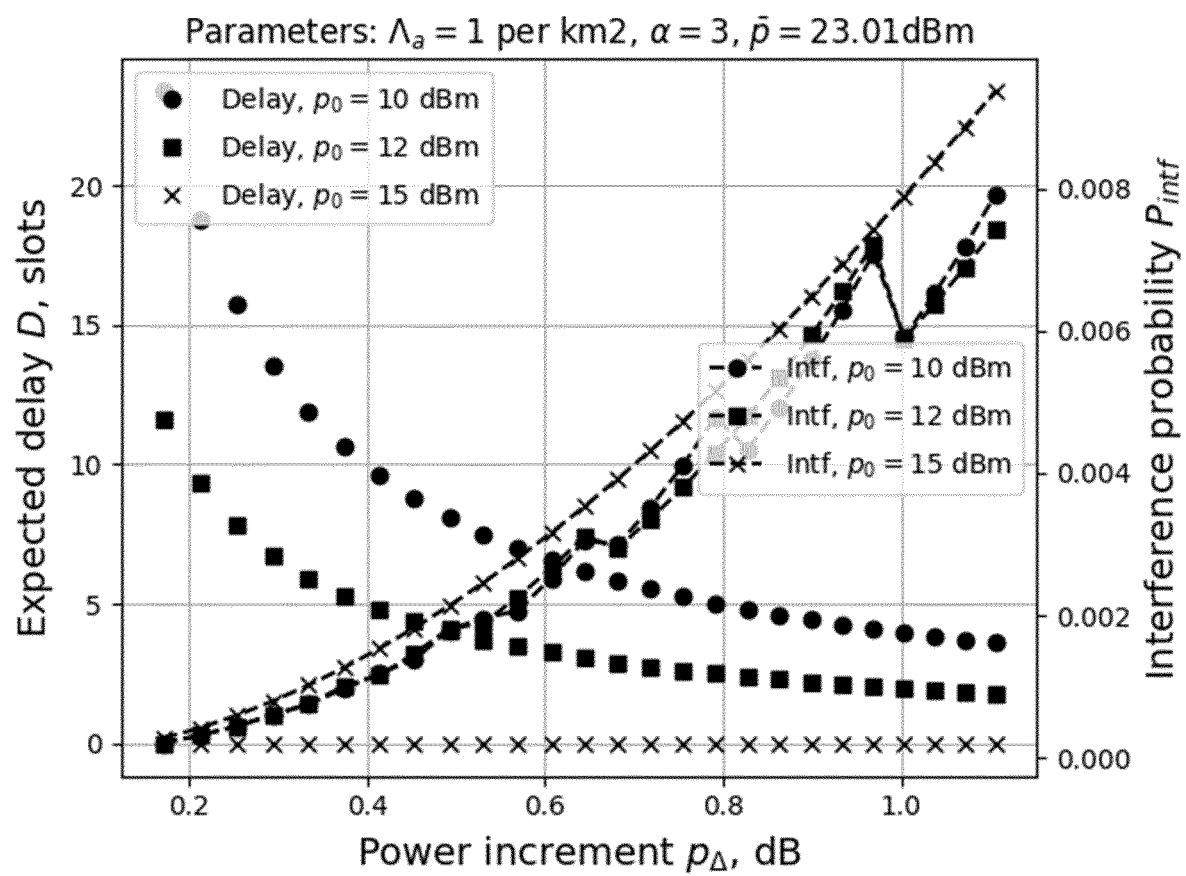
FIG. 5 shows a diagram with exemplary characteristics of expected delay and probability of interfering with another support device versus power increment settings for exemplary parameters.

FIG. 5 shows a diagram with exemplary characteristics of expected delay and interference probability versus power increment settings. The trade-off between expected delay and interference probability is illustrated for exemplary parameters. As can be gathered from FIG. 5, with increasing power increments (e.g., from 0.2 to 1 dB) the expected delay can be reduced (e.g. from 20 to 0 slots) at an increase in interference probability, while an increase of the initial power (e.g. from 10 to 15 dBm) may substantially reduce the expected delay. The choice of the initial power and the power increment can be made use-case specific according to the trade-off required.

According to examples the amount of resources and power ramping settings may be determined based on at least one of density and distribution of the terminal devices and support devices in a cell or other predetermined geographical area.

Turning back to FIG. 3, at step S3 the base station 110 indicates information required for proxy-based operation to the terminal devices 102, 104, 106. In one example the indicated information may comprise information of one or more of resources information and settings information.

In one example the indication can be sent via a broadcast message (e.g., in a SIB).

In another example the indication can be sent via a radio resource control (RRC) message individually for selected terminal devices. In such a case, the base station 110 may identify the support device 108 (e.g. acUE) and the terminal devices (e.g. IoT UEs) 102, 104, 106 to use a proxy-based operation. The base station 110 may identify the support device 108 and the terminal devices by one or more of correlating measurement reports, correlating position information, using timing advance information, using beam information, and using sidelink discovery information such that adjacent terminal devices (in terms of radio condition) can be grouped together.

Where the indication is broadcast to the terminal devices, association of terminal devices to the support device may be probabilistic, for example depending on which support device is reached first with the power ramping procedure.

According to some examples, the resources and power ramping settings can be pre-defined and communicated to terminal devices during set-up of the service, e.g., as part of step S3 of FIG. 3. In this example, when the resources and settings are "pre-defined", it could also be done before step S3 of FIG. 3, in an "offline" manner, e.g., during the set-up of a connection-less service, or whenever the device first establishes a connection to the current cell. If it is pre-set, only an indication is needed in S3. In such examples, only an indication that a proxy-based mode is enabled is needed, which may for example be sent as a configuration index (e.g. the PRACH Configuration Index) with a special meaning. E.g., one (or some) of the 256 different PRACH configuration indices might be reserved to indicate that proxy-based operation with one of the pre-set configurations is enabled in the cell.

In other examples, the base station may indicate during step S3 at least one of resources reserved for the proxy-based operation, and optionally updated power ramping settings. The resources can be indicated in the broadcast information (e.g. SIB2) for the RA handshake procedure of FIG. 2, e.g., as a part of the channel configuration, or via dedicated RRC signalling.

At step S4 of FIG. 3 the terminal devices 102, 104, 106 may initiate use of the indicated resources for contention-based transmissions (e.g. RACH or modifications of it) towards the support device(s) 108. That is, the support device 108 performs a RA operation with the terminal devices 102, 104, 106. The initiation of use of the indicated resources may be decided by the terminal devices themselves, or in response to an indication from base station 110.

According to some examples, a 1-step or 2-step procedure (with or without preamble) may then be used for data transmission between terminal device and support device. That is, according to some examples, the terminal devices 102, 104, 106 may transmit preambles followed by data (2-step procedure) or may directly send the data (1-step procedure), depending on the contention-based access configuration and in a contention-based fashion. In some examples, each terminal device may transmit to its closest support device 108.

According to examples, the support device 108 acknowledges a successful reception of a packet. Using power ramping settings, the terminal device increases the transmit power if no acknowledgement is received. According to some examples, the power ramping procedure, together with planned placement of support devices in dense areas, can be configured, e.g., according to the load and density (actual or anticipated) of terminal devices in the serving area, to minimize the interference for other terminal devices in the proxy-based mode (assuming they re-use the same random access channel resources).

As shown at step S5 in FIG. 3, using the indicated resources the support device 108 performs a random access channel operation with the terminal devices 102, 104, 106, for example in the same way the base station 110 would do.

After successful reception of user data (e.g. in MSG3 of FIG. 2), the support device 108 processes the received data, as shown at step S5. The processing of the data may comprise aggregating the data, in some examples. The processing of the data may also comprise storing the received data.

Then, at step S6 of FIG. 3, the support device 108 forwards the received data to the base station 110.

According to an example the support device 108 may send user data packets to the base station 110 individually. In such examples a user data mapping function (UDMF) may be used for mapping the user data packets from the support device 108 to respective terminal devices (endpoints). This may be considered as transparent sending of the packets from terminal device(s) to the base station 110.

In another example, the support device 108 may aggregate the received data packets and may send the received data packets as an aggregated data packet which contains several data packets from one or more terminal devices. According to some examples, the base station 110 is informed that the data packet comprises an aggregated data packet. This may be considered non-transparent sending of data from terminal device(s) to the base station 110.

Where the data has been aggregated by the support device 108, the UDFM may inspect the packets and may forward them to a respective user plane function (UPF) e.g. at the core network. According to some examples, the aggregated user data packet may be sent by the support device 108 to the base station 110 as any of an RRC message, a dedicated information element (e.g. MAC IE) of the medium access control (MAC) protocol, and a user-plane packet for a dedicated radio bearer terminating at the support device 108. The aggregation may help reduce the overhead, at the expense of potentially longer waiting times. However, the effect of longer waiting times may be reduced by employing a timeout.

The optional mapping of the data packets may be performed at step S7 of FIG. 3.

According to some examples, the UDMF can be located at the base station 110. In other examples, the UDMF may be located in a core network entity like a UPF. In other examples, the UDMF may be located in a dedicated network entity, e.g., for processing of small data packets (e.g. similar to a service capability exposure function (SCEF)). Correspondingly, the UDMF may map user data packets either to endpoints (e.g. terminal devices 102, 104, 106) and interfaces which terminate in the radio access network (RAN) (like the Next Generation (NG) interface), or at a data network (like the N6 interface).

According to some examples, the UDMF may receive data packets, decapsulate them, correlate them with core network interfaces of the radio access network (e.g. access and mobility management function (AMF) or UPF or NG interface) based on an UPF connectionless service identification (UCLSI) depending on the core network of the network architecture (e.g. mIoT architecture) and send them e.g. on the NG interface (or a deviant like fat-pipe, for example).

According to some examples, if no overload on the physical random access channel (e.g. PRACH) is detected for a certain time (e.g. a pre-determined threshold time), and no new packets are arriving from support device(s) 108, the base station 110 may indicate to stop proxy-based operation, or may stop indicating resources for proxy-based operation. This is done generally at step S8 where the base station 110 halts or disables the proxy-based operation.

Figure 4:
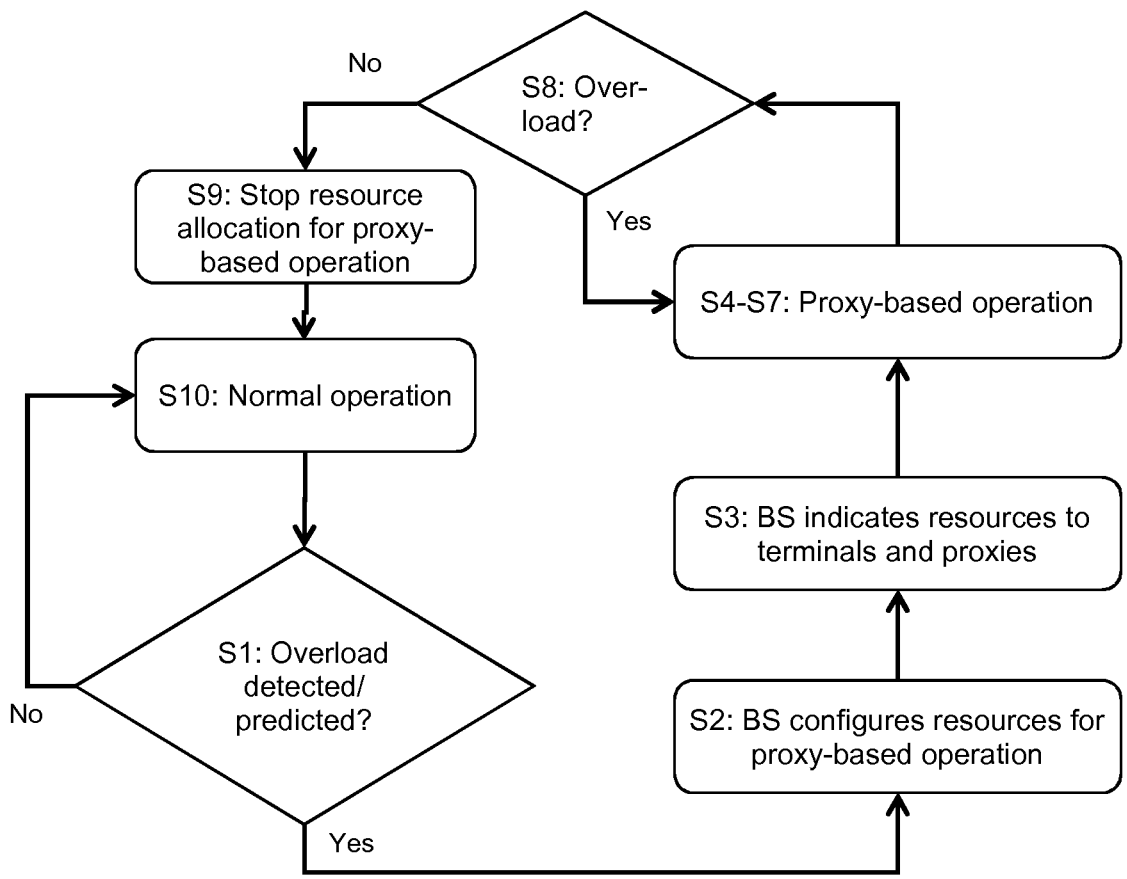
FIG. 4 shows a flow diagram of a proxy-based random access procedure according to another example embodiment.

FIG. 4 shows a loop-based flow diagram of an exemplary operation proxy-based contention access procedure according to another example embodiment, into which the above steps S1 to S8 of FIG. 3 are incorporated. Therefore, the above explanations for the steps S1 to S8 also apply to FIG. 4, when reference is made to these steps.

At step S1, an overload detection or prediction is made. If no overload is detected or predicted, the flow branches to step S10 where a normal contention-based random access operation without support device (i.e. without a proxy mode) is initiated.

Otherwise, if an overload is detected or predicted in step S1, the flow proceeds to step S2 where the base station (BS) configures the resources for a proxy-based operation, as explained above with reference to FIG. 3. Then, in step S3, the base station indicates the configured resources to the terminal devices (e.g. IoT UEs) and support device(s) (e.g. acUE(s)), as explained above with reference to FIG. 3. Thereafter, the flow continues with steps S4 to S7, where the proxy-based operation is performed, as explained above with reference to FIG. 3.

Then, in step S8, it is checked whether an overload situation still exists. If so, the flow jumps back to step S4 and repeats the proxy-based operation according to steps S4 to S7. If no overload is determined (e.g. detected or predicted) in step S8, the flow proceeds to step S9 and the resource allocation for the proxy-based operation is stopped. Then, the flow finally proceeds to step S10 where the normal operation is started. If then, an overload is again detected in step S1, the whole loop-based procedure starts again until no overload is determined anymore.

Figure 6:
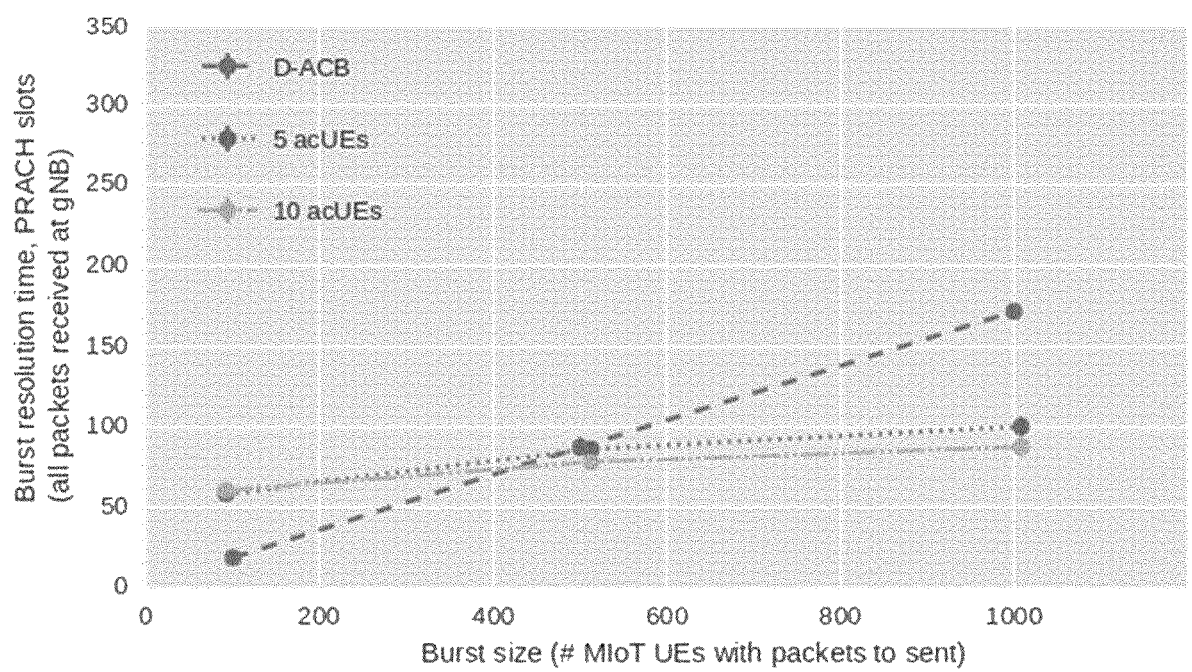
FIG. 6 shows a diagram with exemplary characteristics of burst resolution delay versus amount of active terminal devices for a different number of proxies.

FIG. 6 shows a diagram with exemplary characteristics of burst resolution delay versus amount of active terminal devices for a different number of proxies.

More specifically, a gain of using the proposed support devices 108 can be gathered from the diagram of FIG. 6. Burst resolution delay, or the time it takes for packets of all terminal devices 102, 104, 106 to arrive successfully at the base station 110, is plotted versus the total amount of active terminal devices. The dimensions of the Y-axis (i.e. ordinate) are the number of slots of the physical random access channel (e.g. PRACH), or the time between consecutive channel (or equivalent resources on BWPs/sidelinks) allocations varies between 1 and 20 ms depending on configuration. It can be gathered that the delay is lower while using support devices (e.g. acUEs) where the amount of active terminal devices (e.g. IoT UEs) is high (>500). Note that no dynamic activation of the support devices is assumed in FIG. 6, which explains the lower performance for a lower number of terminal devices. As a contention resolution technique, an optimized access class barring policy has been used (denoted D-ACB in FIG. 6). Of course, where dynamic activation of the support devices is used, the configuration can be selectively optimized for small or large numbers of terminal devices. According to some examples, an access device configures resources for a proxy-based random access operation to the network and transmits an indication of the configured resources and of at least one identified support device and of a plurality of identified terminal devices to use the proxy-based random access operation, wherein the at least one support device is instructed by the indication to act as a proxy for the proxy-based random access operation. Then, the proxy-based random access operation can be enabled for the identified plurality of terminal devices via the at least one support device.

According to some examples described above, delay and number and/or frequency connection request drops can be decreased. This may for example be achieved by at least one of local reuse of channel access resources and reduction of contention resolution times.

Furthermore, according to some examples described above, power can be saved in terminal devices. This may be achieved as a result of the closer distance of the terminal device to the support device than to the base station. Due to the lower distance, less power ramping steps may be needed.

Moreover, according to same examples described above, network coverage may be extended for dense networks.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or a portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device. Some of the examples may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out some of the examples. The one or more computer-executable components may be at least one software code or portions of it.

Further in this regard it should be noted that any blocks of the logic flow as in the Figs. may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Some of the examples may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of exemplary embodiments. However, various modifications and adaptations may become apparent to those skilled in the relevant arts in view of the foregoing description, when read in conjunction with the accompanying drawings and the appended claims. However, all such and similar modifications of the teachings of the described exemplary embodiments will still fall within the scope of this disclosure as defined in the appended claims. Indeed, there is a further exemplary embodiment comprising a combination of one or more exemplary embodiments with any of the other exemplary embodiments previously discussed.

The invention claimed is:

1. An apparatus, comprising:
at least one processor; and
at least one memory including computer program code, the at least one memory and computer program code being configured, with the at least one processor, to cause the apparatus to perform:
configuring, at an access device of a network, resources for a proxy-based random access operation to the network;
transmitting, by the access device, an indication of the configured resources and of at least one identified support device and of a plurality of identified terminal devices to use the proxy-based random access operation, wherein the at least one support device is instructed by the indication to act as a proxy for the proxy-based random access operation;
wherein the at least one memory and computer program code are further configured, with the at least one processor, to cause the apparatus to perform:
transmitting the indication in response to a determination of an overload situation of the network, and
determining the overload situation if a group paging request has been received from the network.

2. The apparatus of claim 1, wherein the at least one memory and computer program code are further configured, with the at least one processor, to cause the apparatus to determine the overload situation if a ratio of preamble collisions to an amount of activated preambles for network access exceeds a predetermined threshold for a predetermined period of time.

3. The apparatus of claim 1, wherein the at least one memory and computer program code are further configured, with the at least one processor, to cause the apparatus to configure the resources according to one or more of a detected current network load, a density or distribution of terminal devices, and a density or distribution of support devices.

4. The apparatus of claim 3, wherein the at least one memory and computer program code are further configured, with the at least one processor, to cause the apparatus to allocate the configured resource allocation by a device-to-device sidelink application or by an allocation of a bandwidth part in dependence on a determined amount of network load.

5. The apparatus of claim 4, wherein the at least one memory and computer program code are further configured, with the at least one processor, to cause the apparatus to select the at least one identified support device and the plurality of identified terminal devices by one or more of correlating measurement reports, correlating position information, using timing advance information, using beam information, and using sidelink discovery information.

6. The apparatus of claim 5, wherein the at least one memory and computer program code are further configured, with the at least one processor, to cause the apparatus to transmit the indication to the plurality of identified terminal devices during a set-up procedure.

7. The apparatus of claim 6, wherein the at least one memory and computer program code are further configured, with the at least one processor, to cause the apparatus to use a user data mapping function for mapping user data packets received from the identified support device to respective ones of the plurality of identified terminal devices.

8. The apparatus of claim 7, where the user data mapping function is located at the access device, in a core network entity, or in a dedicated network entity.

9. The apparatus of claim 8, wherein the at least one memory and computer program code are further configured, with the at least one processor, to cause the apparatus to stop the proxy-based random access operation if a no overload situation has been determined for a predetermined time period and no new data has been received from the at least one support device.

10. An apparatus, comprising:
at least one processor; and
at least one memory including computer program code, the at least one memory and computer program code being configured, with the at least one processor, to cause the apparatus to perform:
receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and
receiving contention-based transmissions from at least some of the plurality of identified terminal devices; and
performing the proxy-based random access operation for the at least some of the identified plurality of terminal devices by forwarding data of the received contention-based transmissions to the access device,
wherein the indication is received in response to a determination of an overload situation of the network if a group paging request has been received from the network.

11. The apparatus of claim 10, wherein the at least one memory and computer program code are further configured, with the at least one processor, to cause the apparatus to aggregate data received from the at least some of the plurality of identified terminal devices and to forward the aggregated received data as an aggregated data packet to the access device.

12. The apparatus of claim 10, wherein the at least one memory and computer program code are further configured, with the at least one processor, to cause the apparatus to forward user data packets received from the at least some of the plurality of identified terminal devices individually to the access device.

13. The apparatus of claim 12, wherein the at least one memory and computer program code are further configured, with the at least one processor, to cause the apparatus to forward data received from the at least some of the plurality of identified terminal devices in one of a radio resource control message, a dedicated MAC information element, and a user-plane packet for a dedicated radio bearer.

14. An apparatus, comprising:
at least one processor; and
at least one memory including computer program code, the at least one memory and computer program code being configured, with the at least one processor, to cause the apparatus to perform:
receiving, from an access device of a network, an indication of configured resources and of at least one identified support device and of a plurality of identified terminal devices to use a proxy-based random network access operation, wherein the at least one identified support device is instructed by the indication to act as a proxy for the proxy-based random access operation; and
transmitting, from one of the plurality of identified terminal devices to the identified support device, contention-based transmissions for initiating the proxy-based random access operation,
wherein the indication is received in response to a determination of an overload situation of the network if a group paging request has been received from the network.

15. The apparatus of claim 14, wherein the at least one memory and computer program code are further configured, with the at least one processor, to cause the apparatus to decide on an initiation of use of the indicated resources in response to an indication of the access device.

16. The apparatus of claim 15, wherein the at least one memory and computer program code are further configured, with the at least one processor, to cause the apparatus to transmit preambles followed by data to the identified support device in a two-step procedure or to directly transmit the data to the identified support device depending on a contention-based access configuration and in a contention-based fashion.

17. The apparatus of claim 16, wherein the at least one memory and computer program code are further configured, with the at least one processor, to cause the apparatus to increase a transmit power if no acknowledgement to the contention-based transmissions has been received.

* * * * *